United States Patent [19]
Weimer

[11] 3,710,301
[45] Jan. 9, 1973

[54] BUS DUCT WITH IMPROVED MEANS FOR CONNECTING HOUSING STRUCTURES

[75] Inventor: Charles L. Weimer, Beaver Falls, Pa.

[73] Assignee: Westinghouse Electric Corporation, Pittsburgh, Pa.

[22] Filed: May 24, 1971

[21] Appl. No.: 146,202

[52] U.S. Cl. .................................339/22 B, 174/99 B
[51] Int. Cl. .................................................H01r 13/60
[58] Field of Search.............339/22; 174/88 B, 99 B; 287/189.36 D; 52/726, 731; 24/31 B

[56] References Cited

UNITED STATES PATENTS

| | | | |
|---|---|---|---|
| 3,339,009 | 8/1967 | Davis et al. | 339/22 B X |
| 2,304,126 | 12/1942 | Skeel | 287/189.36 D |
| 2,966,542 | 12/1960 | Shields | 174/88 B |
| 3,376,377 | 4/1968 | Fehr | 174/72 |
| 3,189,680 | 6/1965 | Stanback | 174/88 |

Primary Examiner—Marvin A. Champion
Assistant Examiner—Robert A. Hafer
Attorney—A. T. Stratton, Clement L. McHale and W. A. Elchik

[57] ABSTRACT

Bus duct comprises two connected sections with each section comprising a housing and a plurality of bus bars supported in the housing. An improved joint cover covers an opening in the housings at the connection and provides structural strength for the housings at the connection.

6 Claims, 7 Drawing Figures

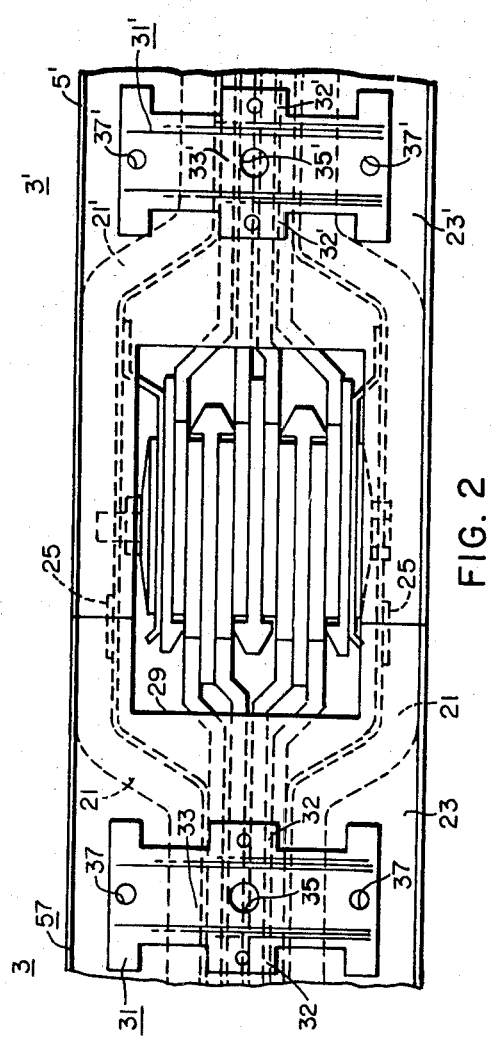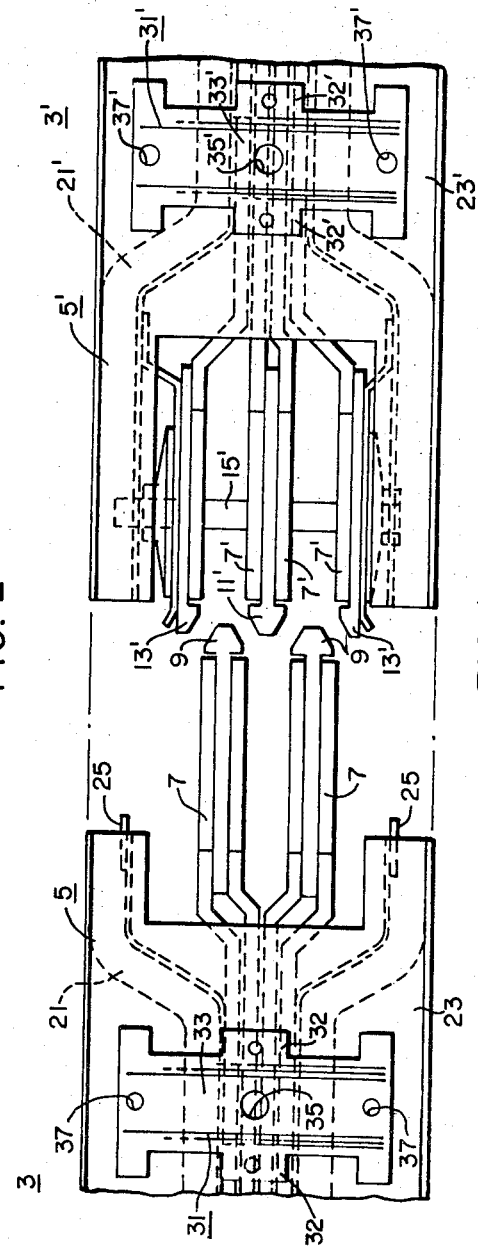

BUS DUCT WITH IMPROVED MEANS FOR CONNECTING HOUSING STRUCTURES

CROSS REFERENCES TO RELATED APPLICATIONS

Parts of the bus duct herein disclosed are disclosed in the application of Charles L. Weimer et al. Ser. No. 146,204 and in the application of Bill M. Shannon et al. Ser. No. 146,205, both of which applications are filed concurrently herewith.

BACKGROUND OF THE INVENTION

1. Field of the Invention

Bus duct comprising elongated sections connectable in an end-to-end relationship.

2. Description of the Prior Art

In the patent to Samuel S. Fouse, U.S. Pat. No. 3,458,647, issued July 29, 1969, there is disclosed bus duct comprising two sections with each section comprising a housing and a plurality of bus bars supported in the housing in a mutually flatwise face-to-face relationship. Each of the housings is an elongated tubular housing comprising a first pair of oppositely disposed housing members adjacent the opposite wide sides of the outer bus bars of the set of bus bars and a second pair of oppositely disposed housing members adjacent the opposite narrow sides of the set of bus bars to provide a tubular construction. The sections are connected in an end-to-end relationship with the first pair of oppositely disposed housing members of the connected sections overlapping and with a splice-plate construction at each of the opposite wide sides for strengthening the housing at the connection. At each narrow side of the bus duct at the connection an opening is provided between the second pair of housing members of one section and the second pair of housing members of the other section and a cover is provided to cover the opening. The cover can be removed to facilitate inspection of the joint.

SUMMARY OF THE INVENTION

This invention comprises two elongated bus duct sections connecting in an end-to-end relationship. Each of the sections comprises a housing and a plurality of bus bars supported in the housing. Each of the bus bars comprises a pair of opposite wide faces and a pair of opposite narrow faces. The bus bars are supported in the housing in a stacked mutually flatwise relationship with the wide faces being in a face-to-face relationship. The housing comprises a first pair of oppositely disposed housing members opposite the wide faces and a second pair of oppositely disposed housing members opposite the narrow faces which housing members cooperate to form a tubular housing construction. The bus duct sections are connected together with the first pair of housing members of the sections overlapping at the connection. The second pair of housing members of the sections are formed such that when the housings are connected together there is an opening at each of the two opposite sides of the bus duct to enable visual inspection of the internal joint connection of the bus bars of the sections. A separate plate is secured to each of the second pair of housing members of each of the sections. Each of the separate plates is provided with a tapped bolt-receiving opening therein and a pair of stud-receiving openings therein on opposite sides of the bolt-receiving opening. A separate joint cover is provided for covering each of the openings and for providing structural strength for the housing at the connection. Each of the joint covers comprises a pair of bolt receiving openings therein in proximity to the opposite ends thereof, and there are a pair of studs fixedly secured to the joint cover on opposite sides of each of the bolt-receiving openings. Each of the joint covers is supported on the associated housing members to close the associated opening with the studs of each joint cover extending into the stud-receiving openings of the separate plates and with the bolts being threaded into the tapped openings in the separate plates to removably secure the joint cover on the housings covering the associated opening and providing structural strength for the housing at the connection.

BRIEF DESCRIPTION OF THE DRAWINGS

FIG. 1 is a side elevational view of parts of two sections of bus duct in a separated position;

FIG. 2 is a side elevational view of the sections of bus duct seen in FIG. 1 in the connected position;

DESCRIPTION OF THE PREFERRED EMBODIMENT

Figure 3:
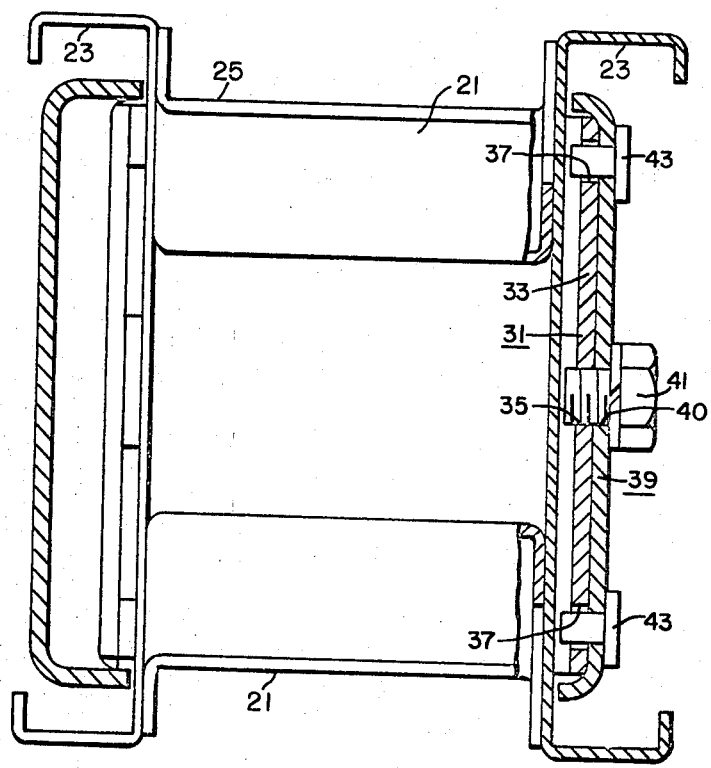
FIG. 3 is an end view, partly in section, of the housing of the bus duct section seen on the left in FIG. 1 with the joint covers added in section to illustrate the invention.

Referring to the drawings, there is shown, in FIG. 1, two parts of two sections of bus duct 3 and 3'. The bus duct sections 3 and 3' are of identical construction, with the right-hand end of both sections being like that shown for the bus duct 3 in FIG. 1 and with the left-hand end of both sections being like that shown for the bus duct section 3' in FIG. 1. The sections are connectable in an end-to-end relationship as shown in FIG. 2. The general construction of the bus duct sections 3, 3' is more specifically described in the above-mentioned patent application of Charles L. Weimer et al. Ser. No. 146,204 and in the above-mentioned patent application of Bill M. Shannon et al. Ser. No. 146,205 filed concurrently herewith. Thus, only a brief description of the general construction of the bus duct sections is provided herein. Each of the sections 3, 3' comprises a housing 5, 5' and a set of four bus bars 7, 7' supported in the associated housing 5, 5'. A pair of rigid molded insulating members 9 are supported on the bus bars 7 with each of the insulating members being disposed between two of the bus bars 7. A rigid molded insulating member 11' is supported between two of the bus bars 7' of the section 3', and a pair of rigid insulating members 13' are supported between the outer of the bus bars 7' and the associated housing members. A single insulating bolt structure 15' extends through suitable openings in the bus bar 7' and insulating members 11', 13'. When the sections are moved together (FIG. 2) the bus bars 7 overlap with the bus bars 7' and the insulating bolt means 15' is tightened down to compact the bus bars 7, 7' and the insulating members into a tightened compact sandwiched relationship to electrically and physically connect the bus bars 7, 7' in the manner more specifically described in the above-mentioned patent application of Charles L. Weimer et al., Ser. No. 146,204.

Each of the housings 5, 5' comprises a first pair of oppositely disposed housing members 21, 21' and a second pair of oppositely disposed housing members 23, 23'. As can be understood with reference to FIG. 3, the housing members 21, 21' are elongated channel members generally U-shaped in cross-section, and the housing members 23, 23' are elongated channel members generally C-shaped in cross-section with the free ends of the legs bent inward generally toward each other. The bus bars are generally flat bus bars with each bus bar comprising a pair of oppositely disposed wide faces and a pair of oppositely disposed narrow faces. The oppositely disposed housing members 21, 21' are disposed opposite the wide faces of the set of bus bars and the housing members 23, 23' are disposed opposite the narrow faces of the set of bus bars. As is described in the above-mentioned patent application of Charles L. Weimer et al., Ser. No. 146,204, along the length of each of the sections the housing members 21, 21' are forced against the wide faces of the outer bus bars to maintain the set of bus bars in a compact sandwiched relationship in order to provide for heat dissipation. The housing members 21, 21' are members of aluminum or base alloys of aluminum to provide for good heat dissipation. The housing members 23, 23' are members of steel for structural strength. As can be seen in FIG. 1, a plate 25 is welded or otherwise fixedly secured to the front of the bight portion of each of the housing members 21. When the sections are moved into the connected position seen in FIG. 2, the plates 25 of the housing members 21 overlap the bight portions of the housing members 21' to close off the two opposite sides of the housing at the connection. As can be understood with reference to FIGS. 1 and 2, the housing members 23, 23' are formed such that when the sections are connected together there is a generally rectangular large opening 29 at each side of the connected bus duct sections which openings 29 enable visual inspection of the internal connection of the bus duct sections.

A pair of metal plates 31 are welded or otherwise fixedly secured at securing parts 32 thereof to each of the housing members 23 in proximity to each end of the bus duct section 3, and a pair of similar metal plates 31' are welded or otherwise fixedly secured at securing parts 32' thereof to each of the housing members 23' in proximity to each end of the bus duct section 3'. As can be understood with reference to FIGS. 1–3 each of the plate members 31 is bent upward between the securing parts 32 thereof to provide a center raised part 33 that is spaced from the housing member 23, and each of the plate members 31' is bent upward between the securing parts 32' thereof to provide a center raised part 33' that is spaced from the housing member 23'. Each of the plate members 31 is formed with a tapped bolt-receiving opening 35 in the raised part 33 thereof and a pair of stud-receiving openings 37 in the raised part 33 thereof at opposite sides of the associated bolt-receiving opening 35. Each of the plates 31' is formed with a tapped bolt-receiving opening 35' in the raised part 33' thereof and a pair of stud-receiving openings 37' in the raised part 33' thereof on opposite sides of the associated bolt-receiving opening 35'.

Figure 4:
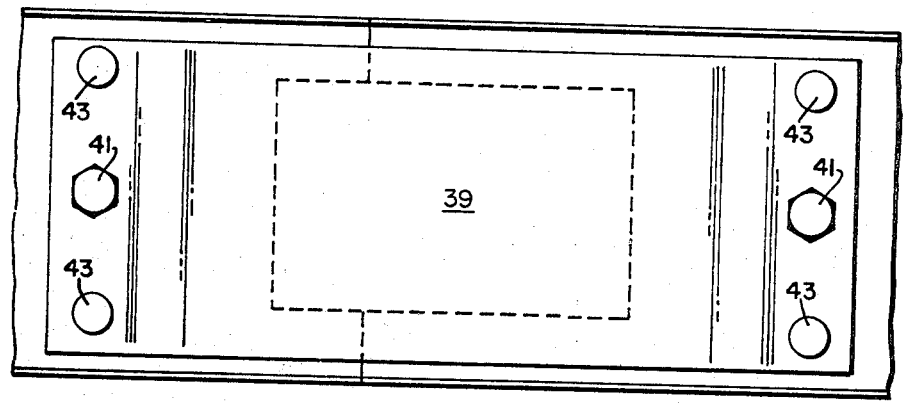
FIG. 4 is a side elevational view similar to FIG. 2 with the joint cover mounted on the bus duct.
Figure 5:
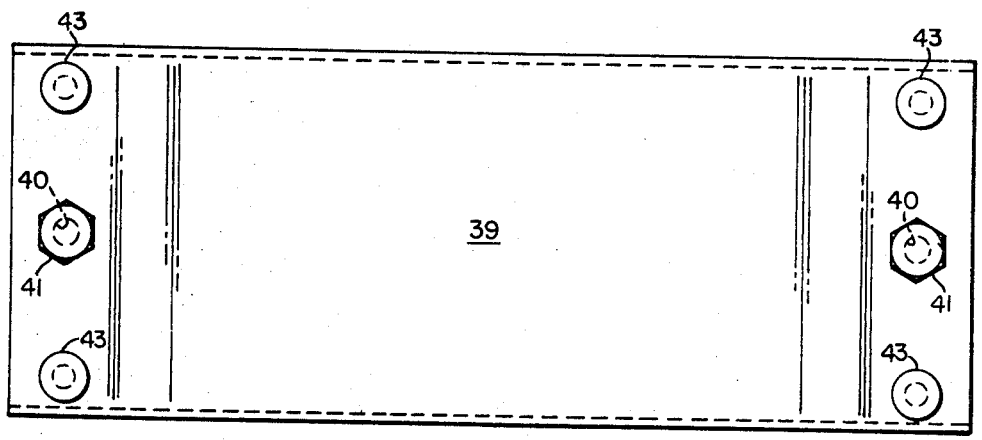
FIG. 5 is a side elevational view of the joint cover illustrated in FIG. 4.
Figure 6:
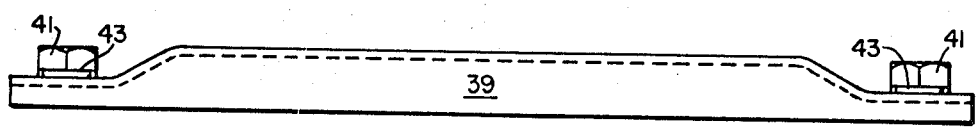
FIG. 6 is a bottom view of the joint cover seen in FIG. 5.
Figure 7:
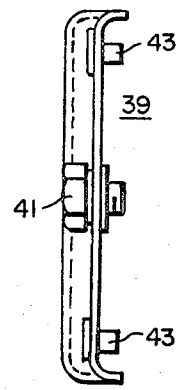
FIG. 7 is an end view of the joint cover seen in FIG. 5.

A joint cover 39 (FIGS. 4–7) is provided for closing each of the openings 29 and for providing structural strength to the housings of the bus duct sections at the connection. The joint cover 39 is a rigid steel member to provide structural strength. Referring to FIGS. 3, 5 and 7, it can be understood that the joint cover 39 is formed with a pair of bolt receiving openings 40 at the opposite ends thereof, and a threaded bolt 41 extends through each of the bolt receiving openings. At each end of the joint cover 39 a pair of rigid metal studs 43 are welded or otherwise fixedly secured to the joint cover 39 on the opposite sides of the associated bolt receiving opening 40. When it is desired to close off one of the openings 29 the associated joint cover 39 is moved into the position shown in FIG. 4 with the studs 43 extending into the associated stud-receiving openings 37, 37' of the associated plates 31, 31', and each of the bolts 41 is threaded into the associated tapped bolt-receiving opening 35, 35' to fixedly secure the joint cover 39 on the housings 5, 5' providing structural strength for the housings at the connection and covering the associated opening 29. With the two joint covers 39 in position on opposite sides of the bus duct section closing off the two openings 29, and with the plates 25 overlapping the bight portions of the housing member 21' at the other two sides of the bus duct sections, the bus duct sections are totally enclosed at the connection.

I claim:

1. Bus duct comprising two bus duct sections, each of said sections comprising a housing and a plurality of bus bars supported in the housing, each of said housings comprising four sides forming an elongated tubular housing, means connecting said sections together with the end of a first side of one of said sections being in an adjacent end-to-end relationship with the end of a first side of the other of said sections, said first sides being formed to provide an opening in the first side of said connected sections at said connection, a separate plate secured to each of said first sides, each of said separate plates comprising a raised part spaced from the associated housing member, each of said separate plates having a tapped bolt-receiving opening therein in the raised part thereof and a stud-receiving opening therein in the raised part thereof, a joint cover having a pair of bolt-receiving openings therein and a pair of studs fixed thereon, said joint cover being supported on said housing covering said opening with said studs extending into said stud-receiving openings of said separate plates, and a pair of bolts extending through said bolt-receiving openings in said joint cover and being threaded into said tapped bolt receiving openings in said separate plates to secure said joint cover to said housing.

2. Bus duct according to claim 1, each of said separate plates having a tapped bolt-receiving opening therein in the raised part thereof and a pair of stud-receiving openings therein in the raised part thereof on opposite sides of the associated tapped bolt-receiving opening, said joint cover having a pair of bolt-receiving openings therein in proximity to the opposite ends thereof, said joint cover having a pair of studs fixed thereon at each of the opposite ends thereof with each of said pairs of studs being disposed on opposite sides of the associated bolt-receiving opening, said joint cover being supported on said housings covering said opening with said studs extending into said stud-receiving openings of said separate plates, and a pair of bolts extending through said bolt-receiving openings in said joint cover and being threaded into said tapped bolt-receiving openings in said separate plates to secure said joint cover to said housing.

3. Bus duct comprising two bus duct sections each of said sections comprising a housing and a plurality of bus bars supported in the housings, each of said bus bars comprising a pair of opposite wide faces and a pair of opposite narrow faces, in each of said sections the bus bars being supported in said housing in a stacked relationship with the wide faces being in a mutually flatwise face-to-face relationship, each of said sections comprising a first pair of oppositely disposed housing members adjacent the opposite wide faces of the associated set of bus bars and a second pair of oppositely disposed housing members adjacent the opposite narrow faces of the associated set of bus bars, in each of said sections the associated first and second pairs of housing members being secured together to provide an elongated tubular housing construction, means connecting said bus duct sections together in an end-to-end relationship with bolt means connecting the bus bars at the connection, said first pair of oppositely disposed housing members of said two sections overlapping at the associated opposite sides of said housing to enclose the associated opposite sides of said housing, at least one pair of said second pair of oppositely disposed housing members of said two sections having opening means therein to enable visual inspection of the internal connection of said connected sections, a separate plate secured to each housing member of said one pair of housing members, each of said separate plates comprising a raised part spaced from the associated housing member, each of said separate plates having a tapped bolt-receiving opening therein in the raised part thereof and a stud-receiving opening therein in the raised part thereof, a joint cover having a pair of bolt-receiving openings therein in proximity to the opposite ends thereof and a stud fixed thereon in proximity to each of the opposite ends thereof, said joint covers being supported on said one pair of housing members over said opening with said studs extending into the stud-receiving openings of said separate plates, and a pair of bolts extending through said bolt-receiving openings in said joint cover and being threaded into said tapped bolt-receiving openings in said separate plates to secure said joint cover to said housings with said joint cover covering said opening means and providing structural strength to said housings at said connection.

4. Bus duct according to claim 3, each of said separate plates having a tapped bolt-receiving opening therein in the raised part thereof and a pair of stud-receiving openings therein in the raised part thereof on opposite sides of the associated tapped bolt-receiving openings, said joint cover having a pair of said bolt-receiving openings therein at each of the opposite ends thereof and a pair of studs affixed thereto at each of the two opposite ends thereof with each pair of studs being disposed on opposite sides of the associated bolt-receiving opening, said joint cover being supported on said one pair of housing members over said opening means with said studs extending into said stud-receiving openings of said separate plates.

5. Bus duct according to claim 3, each of said second pair of oppositely disposed housing members having opening means therein to enable visual inspection of the internal connection of said connected sections, a separate one of said plates being secured to each housing member of said second pair of housing members, a separate one of said joint covers for each of said openings, and a separate pair of said bolts securing each of said joint covers to the associated plates to secure the associated joint cover to said housings with each joint cover covering the associated opening means and providing structural strength to said housings at said connection.

6. Bus duct according to claim 4, each of said second pair of oppositely disposed housing members having opening means therein to enable visual inspection of the internal connection of said connected sections, a separate one of said plates being secured to each housing member of said second pair of housing members, a separate one of said joint covers for each of said openings, and a separate pair of said bolts securing each of said joint covers to the associated plates to secure the associated joint cover to said housings with each joint cover covering the associated opening means and providing structural strength to said housings at said connection.

* * * * *